J. P. COLLINS.
LINE SHAFT OILER.
APPLICATION FILED SEPT. 28, 1917.

1,261,010. Patented Apr. 2, 1918.

INVENTOR
Joseph P. Collins
BY
ATTORNEYS.

UNITED STATES PATENT OFFICE.

JOSEPH P. COLLINS, OF GOOSE CREEK, TEXAS.

LINE-SHAFT OILER.

1,261,010.   Specification of Letters Patent.   Patented Apr. 2, 1918.

Application filed September 28, 1917. Serial No. 193,831.

*To all whom it may concern:*

Be it known that I, JOSEPH P. COLLINS, a citizen of the United States, residing at Goose Creek, in the county of Harris and State of Texas, have invented certain new and useful Improvements in Line - Shaft Oilers, of which the following is a specification.

This invention relates to new and useful improvements in a line shaft oiler.

The object of the invention is to provide a device of the character described whereby the bearings of permanently located line shafts may be easily oiled.

Another object of the invention is to provide a device of the character described whereby a fixed quantity of oil may be supplied to each bearing, thus eliminating waste of lubricating oil.

A further feature of the invention resides in the provision of a device of the character described which is cheaply and easily constructed and which may be readily operated.

With the above and other objects in view, the invention has particular relation to certain novel features of construction, operation and arrangement of parts, an example of which is given in this specification and illustrated in the accompanying drawings wherein:—

Figures 1, 2, 3, 4:
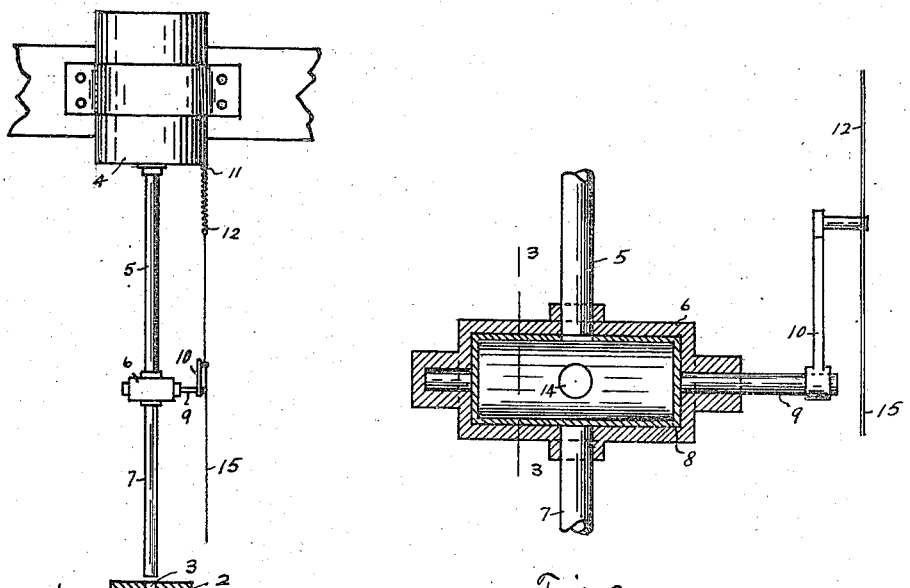
Figure 1 is a side elevation of the device.
Fig. 2 is a longitudinal sectional view of the valve employed.
Fig. 3 is a transverse sectional view of the valve, taken on the line 3—3 of Fig. 2, showing the valve in position to receive a charge of lubricant.
Fig. 4 is a transverse sectional view thereof showing the valve in position to discharge the lubricant into the bearing.

Referring now more particularly to the drawings wherein like numerals of reference designate similar parts in each of the figures, the numeral 1 refers to a line shaft which is rotatable in the bearing 2, said bearing being equipped with the oil cup 3 of the well known form. The numeral 4 refers to a lubricant container which is fixed to any suitable support and from which leads the pipe 5 to the lower end of which the cylindrical hollow valve casing 6 is secured. Alined with the pipe 5 and leading from the valve casing is the discharge pipe 7 which terminates over, and discharges oil into the cup 3. Rotatable within the valve casing is a rotatable hollow valve 8 of a form to fit within said casing, said valve having suitable bearings in the ends of casing and being provided with a stem 9 which is manipulated by the crank arm 10. The free end of this arm is connected to a fixed support 11 by means of a yieldable member 12 which normally holds the valve closed. This valve is provided with an inlet orifice 13 and an outlet orifice 14 spaced apart, the former normally registering with the pipe 5 and the latter normally being closed by the casing 6. The hollow valve 8 is thus normally filled with oil. When it is desired to oil the bearing, the stem 9 is turned through the instrumentality of the arm 10, thus carrying the orifice 13 out of registration with the pipe 5 and then carrying the outlet orifice 14 into registration with the pipe 7 and permitting the charge of oil within the valve to drain out through the pipe 7, into the oil cup 3. This will usually require only a quarter turn of the valve. The arm 10 may be manipulated by means of the cable 15 attached to the free end thereof and within reach of the operator. When this cable is released, the yieldable member 12 will restore the valve to its original position permitting the valve to again fill with oil. A predetermined quantity of lubricant may thus be supplied to the bearing when desired.

What I claim is:

1. A device of the character described including a fluid container, a conduit leading therefrom formed into sections, a hollow valve casing, one of said sections forming an inlet to said casing and the other forming an outlet therefrom, a hollow rotatable valve fitted within the casing and provided with an inlet and an outlet orifice through the wall thereof, said orifices being spaced apart and so located that when one of said orifices registers with its corresponding conduit, the other will be out of registration with its corresponding conduit, manual means for rotating the valve in one direction to cause said orifices to register alternatively with their corresponding conduits and a yieldable member tending to rotate the valve in the opposite direction.

2. A device of the character described including a container for lubricants, a conduit leading therefrom formed of sections, a hollow valve casing, one of said sections forming an inlet to, and the other section forming an outlet from, said casing, a hollow rotatable valve fitted within the casing and provided with an inlet and an outlet orifice, means for holding said valve in position that the inlet orifice will normally register with the inlet conduit and yieldable means for rotating the valve to bring the inlet orifice out of registration with the inlet conduit and to simultaneously bring the outlet orifice into registration with the outlet conduit.

3. A device of the character described including a container for lubricants, a conduit leading therefrom formed of sections, a hollow valve casing, one of said sections forming an inlet to, and the other section forming an outlet from, said casing, a hollow rotatable valve fitted within the casing and provided with an inlet and an outlet orifice, yieldable means for holding said valve in position that the inlet orifice will normally register with the inlet conduit and manual means for rotating the valve to bring the inlet orifice out of registration with the inlet conduit and to simultaneously bring the outlet orifice into registration with the outlet conduit.

4. A device of the character described including a container for lubricants, a conduit leading therefrom formed of sections, a hollow valve casing, one of said casing sections forming an inlet to, and the other section forming an outlet from, said casing, a hollow rotatable valve fitted within the casing and provided with an inlet and an outlet orifice, a stem fixed to said valve, a crank-arm fixed to the stem, a yieldable member, one end of which is attached to the crank-arm and the other end of which is attached to a stationary object and whereby the valve is held in position so that the inlet orifice will normally register with the inlet conduit, and manual means attached to said crank for rotating the valve to bring the inlet orifice out of registration with the inlet conduit, and to simultaneously bring the outlet orifice into registration with the outlet conduit.

In testimony whereof I have signed my name to this specification in the presence of two subscribing witnesses.

JOSEPH P. COLLINS.

Witnesses:
 FRANCIS WHITE,
 THOMAS E. FALEY.

Copies of this patent may be obtained for five cents each, by addressing the "Commissioner of Patents, Washington, D. C."